United States Patent [11] 3,576,421

| [72] | Inventor | Harry J. Fiegel, Jr. Galveston, Tex. |
| --- | --- | --- |
| [21] | Appl. No. | 816,665 |
| [22] | Filed | Apr. 16, 1969 |
| [45] | Patented | Apr. 27, 1971 |
| [73] | Assignee | Kelso Marine, Inc. |

[54] WELDING MACHINE
17 Claims, 6 Drawing Figs.

[52] U.S. Cl. ..................................... 219/130, 219/124, 219/160
[51] Int. Cl. ..................................... B23k 9/00
[50] Field of Search .......................... 219/130, 125, 102, 101, 79, 82, 124, 160

[56] References Cited
UNITED STATES PATENTS

| 1,851,563 | 3/1932 | Chapman | 219/125 |
| 2,866,077 | 12/1958 | Morton | 219/125 |
| 2,957,071 | 10/1960 | Cooper | 219/82 |
| 3,007,031 | 10/1961 | Cooper | 219/82 |

*Primary Examiner*—Milton O. Hirshfield
*Assistant Examiner*—R. Skudy
*Attorneys*—Jack W. Hayden and Richard E. Bee ABSTRACT: A conveyor system moves a pair of structural steel plates into position to be butt welded to one another. Upper and lower clamping assemblies move into engagement with both plates near the edges to be welded. A body of welding flux contained in a flux trough located on the lower clamping assembly is urged against the underside of the plates along and to either side of the edges to be welded. A welding mechanism mounted on a movable carriage supported by the upper clamping assembly moves along the upper side of the plates adjacent the edges to be welded for welding such edges to one another.

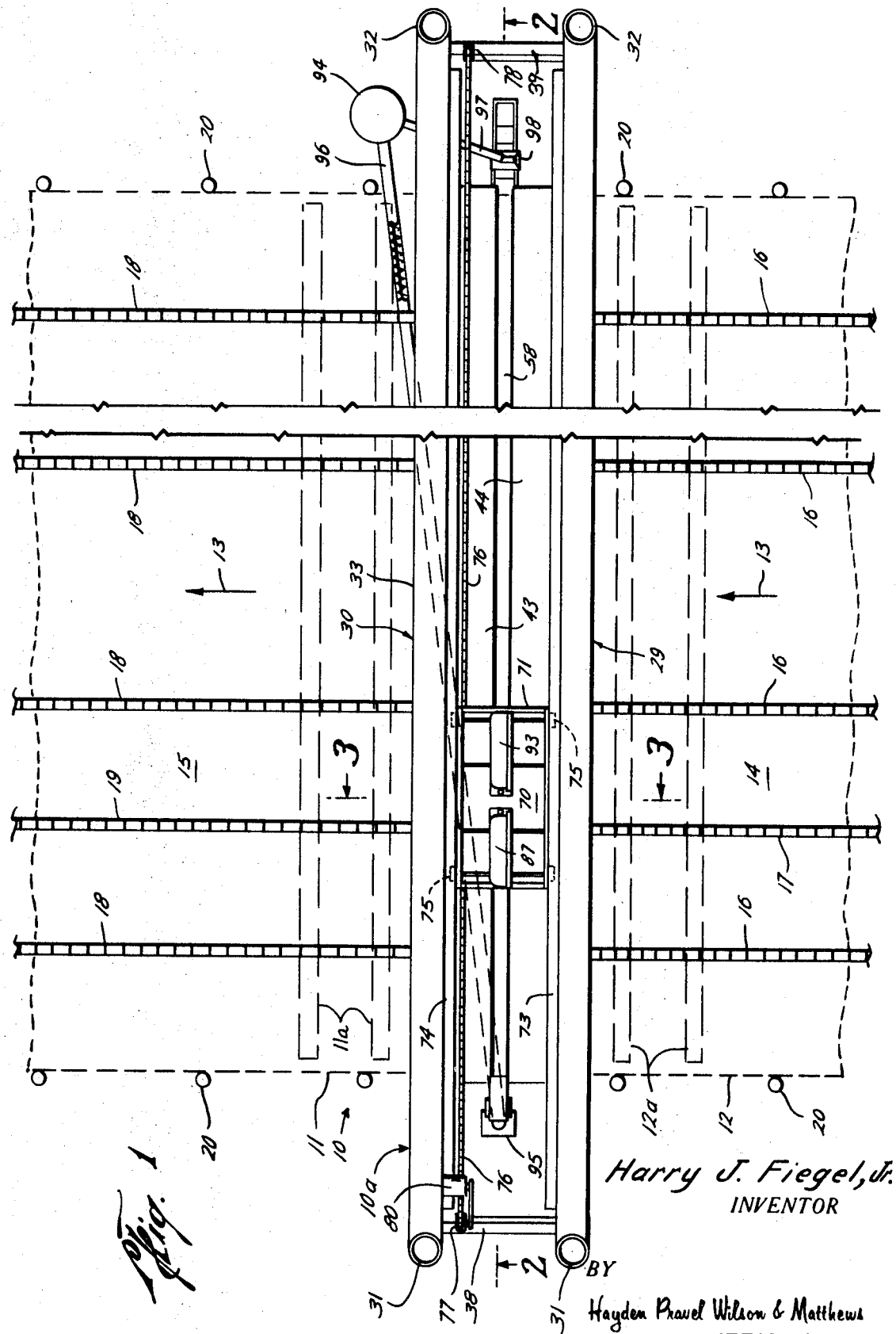

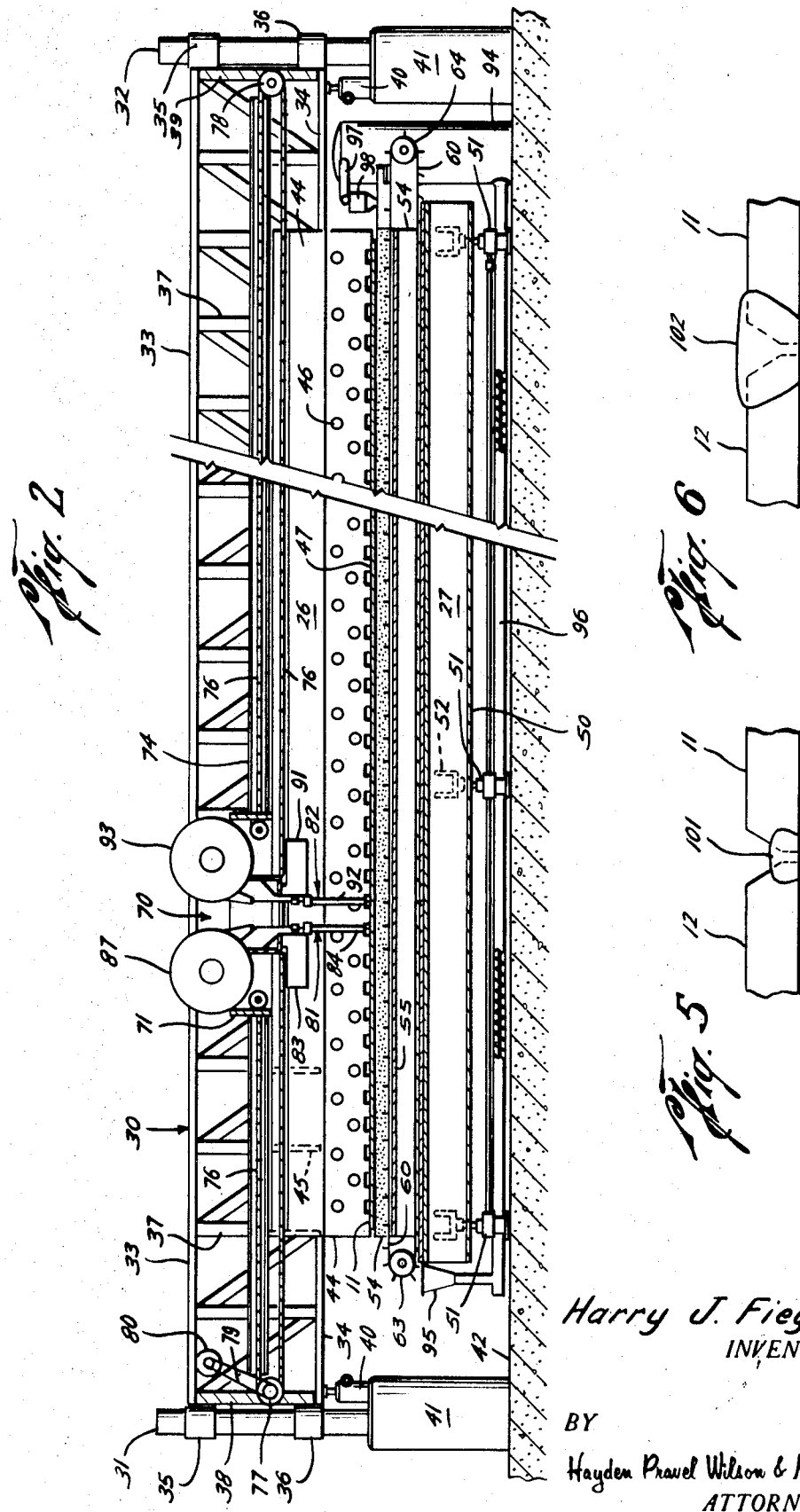

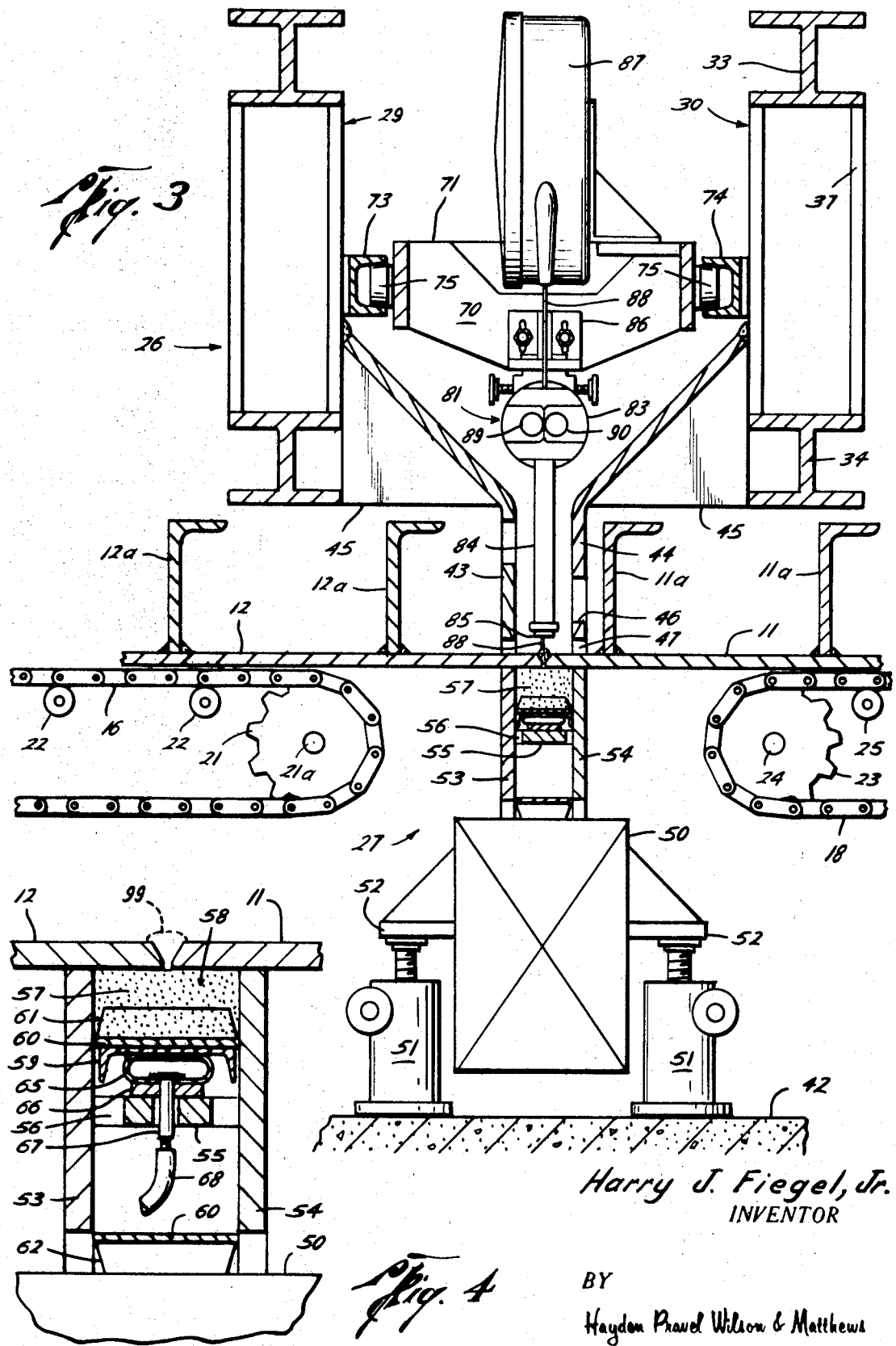

3,576,421

WELDING MACHINE

BACKGROUND OF THE INVENTION

This invention relates to welding machines and particularly to welding machines for welding structural steel plates to one another.

Various types of building structures, industrial structures, ships, boats and marine vessels, or major portions of such items, can be manufactured by combining series or groups of reinforced structural panels. Such panels would take the form of structural steel plates having a series of structural steel shapes, such as I-beams, T-beams, angles, channels and flat bars, attached thereto for reinforcing purposes. The appropriate numbers of these panels can then be combined into groups by butt welding the plates of such panels to one another. Such groups would form prefabricated units constituting major sections of the overall structure.

Prefabricated units of this type can be advantageously used in the manufacture of various items which are manufactured in relatively large quantities. An example would be the manufacture of marine barges or marine cargo vessels wherein it might be desired to manufacture a hundred or more of the barges or vessels during a single production run. In such a case, the various hull sections, bulkhead sections, and so forth, can be quickly formed by welding together various groups of the reinforced structural panels. This requires the making of a relatively large number of plate-to-plate welds in order to provide the relatively large number of prefabricated sections which are required. The problem is further complicated because the structural panels used for different portions of the overall structure are not all of the same size. The plates are of different sizes. The shapes are of different types and sizes and are arranged in differing configurations on the structural panels for the different portions of the overall structure.

As far as is known, there are no presently available welding machines for satisfactorily providing a rapid, efficient and automatic type of welding operation in this type of a situation. While, on the other hand, resort may be had to manual welding techniques, such manual techniques are relatively slow, inefficient and relatively expensive in terms of labor requirements.

SUMMARY OF THE INVENTION

It is an object of the invention, therefore, to provide a new and improved welding machine for welding together sets of structural steel plates in a relatively rapid and efficient manner.

It is another object of the invention to provide a new and improved welding machine capable of butt welding two relative thick steel plates to one another with only one pass of the welding mechanism along the joint.

It is a further object of the invention to provide a new and improved welding machine for rapidly forming a relatively large number of sets of welded together reinforced structural panels.

In accordance with the invention, a welding machine for butt welding one plate to another comprises conveyor means for feeding the plates to be welded into a welding position with the edges to be welded abutting one another. The welding machine further includes clamping means for clamping both plates near the edges to be welded. The welding machine additionally includes welding flux means for urging a body of welding flux against one side of the plates along and to either side of the edges to be welded. The welding machine further includes welding means movable along the other side of the plates adjacent the edges to be welded for welding such edges to one another.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a plan view of a representative embodiment of a welding machine constructed in accordance with the present invention;

FIG. 2 is an elevational type cross-sectional view taken along section line 2–2 of the welding machine of FIG. 1;

FIG. 3 is an enlarged cross-sectional view taken along section line 3–3 of FIG. 1;

FIG. 4 is an enlarged view of a portion of the structure shown in FIG. 3; and

FIGS. 5 and 6 show different stages in the development of a welding bead joining a typical pair of relatively thick plates.

DESCRIPTION OF THE PREFERRED EMBODIMENT

Referring to FIG. 1, there is shown a welding machine 10 for butt welding one structural steel plate to another. The location of a portion of a first plate is indicated in outline form at 11, while the location of a portion of a second plate is indicated in outline form at 12. As will be seen, these plates may have welded to one side thereof a series of structural steel shapes which may, for example, take the form of I-beams, T-beams, angles, channels, flat bars, or the like. The locations of typical ones of these structural steel shapes are indicated in outline form at 11a for the case of the plate 11 and at 12a for the case of the plate 12. The longitudinal dimension of these shapes runs parallel to the longitudinal dimension of the main body 10a of the welding machine 10. The forward direction of movement of the plates 11 and 12 relative to the overall manufacturing operation is indicated by arrows 13. As will be seen, welding machine 10 is capable of providing an automatic operation whereby successive pairs of plates are butt welded to one another.

The welding machine 10 includes conveyor means for feeding the plates to be welded into a welding position with the edges to be welded abutting one another. This conveyor means includes first and second conveyor mechanisms 14 and 15 located on opposite sides of the main body 10a of the welding machine 10. The conveyor mechanism 14 located on the upstream side of the main body 10a of the welding machine 10 includes a series of conveyor chains 16 spaced apart from one another in a side-by-side manner and running in a direction transverse to the longitudinal dimension of the main body 10a of the welding machine 10. The plate 12 rests on the top surfaces of these conveyor chains 16. The conveyor mechanism 14 further includes periodic pushing chains, one of which is indicated at 17. These pushing chains 17 run parallel to the conveyor chains 16 with their top surfaces being a couple of inches below the top surfaces of the conveyor chains 16. These pushing chains 17 are equipped with retractable dogs which engage the upstream end of the plate 12 for pushing it in the forward direction indicated by the arrows 13.

The second conveyor mechanism 15 located on the downstream side of the main body 10a of the welding machine 10 is of a similar construction and includes a series of conveyor chains 18 which support the plate 11. The conveyor mechanism 15 also includes a set of intermediate pushing chains, one of which is indicated at 19. These pushing chains 19 are equipped with retractable dogs for engaging either the upstream end or the downstream end of the plate being carried by the conveyor chains 18.

Sets of guide rollers 20 are provided along both sides of the conveyor mechanisms 14 and 15 for contacting the edges of the plates 11 and 12 and keeping such plates centered on the conveyor mechanisms 14 and 15.

The manner of construction of the conveyor mechanisms 14 and 15 is shown in greater detail in the cross-sectional view of FIG. 3. FIG. 3 shows side views of portions of typical ones of the conveyor chains 16 and 18. Note that pushing chains 17 and 19 have been omitted for simplicity of explanation. As indicated in FIG. 3, each conveyor chain 16 is supported on a sprocket 21, the various sprockets 21 being mounted on a common drive shaft 21a. The far ends of the conveyor chains 16 (not shown) are supported by a similar sprocket and shaft arrangement. The intermediate portions of the upper spans of the chains 16 are supported by a series of support rollers 22. A motor (not shown) is coupled to the drive shaft 21a for purposes of advancing the conveyor chains 16.

A similar manner of construction is provided for the downstream conveyor chains 18. In particular, conveyor chains 18 are mounted on sprockets 23 which are, in turn, mounted on a common shaft 24. Intermediate support rollers 25 are provided for the top spans of chains 18. A motor (not shown) is coupled to the shaft for the corresponding sprockets (not shown) which support the far end of the conveyor chains 18 (not shown).

The welding machine 10 further includes clamping means for clamping both plates to be welded near the edges to be welded. As best seen in the elevational-type cross-sectional view of FIG. 2, this clamping means includes a retractable upper clamping assembly 26 located above the plates to be welded and a retractable lower clamping assembly 27 located below the plates to be welded.

The upper clamping assembly 26 includes a pair of elongated support frames 29 (FIG. 1) and 30 which extend across the conveyor mechanisms 14 and 15. These support frames 29 and 30 are movably supported on sets of vertical guide columns 31 and 32 which are located on opposite sides of the conveyor mechanisms 14 and 15. As indicated in FIG. 2, the downstream support frame 30 includes elongated upper and lower support beams 33 and 34 which are secured to collar members 35 and 36 which are slidably mounted on the guide columns 31 and 32. Periodic vertical I-beams 37 are secured between the upper and lower elongated support beams 33 and 34 of this back support frame 30. The front and back support frames 29 and 30 are tied to one another at the ends thereof by means of crossmembers 38 and 39.

The upper clamping assembly 26 further includes elevator means for raising and lowering such upper clamping assembly 26. This elevator means includes a system of synchronized screwjacks 40 located between the lower ends of the support frames 29 and 30 and concrete footing members 41 which rest on a concrete flooring 42. Footing members 41 also support the lower ends of the vertical guide columns 31 and 32. The drive shafts of the screwjacks 40 are coupled to a motor (not shown) which, when activated, causes the jacks 40 to raise or lower the support frames 29 and 30, depending on the direction of rotation of the motor.

As best seen in FIG. 3, the upper clamping assembly 26 also includes a pair of elongated spaced-apart downwardly extending clamping structures 43 and 44. These clamping structures 43 and 44 are in the form of bent plates, the upper outwardly flaring ends of which are attached to the front and back support frames 29 and 30, respectively. Periodic brace members 45 serve to maintain the downwardly extending vertical portions of the clamping structures 43 and 44 in the proper positions. As indicated in FIG. 3, the clamping structure 43 is adapted to engage the plate 12 near the edge to be welded, while the clamping structure 44 is adapted to engage the plate 11 near the edge to be welded.

A front elevational view of the back clamping structure 44 is shown in FIG. 2. As there indicated, the vertical lower portion of the clamping structure 44 is provided with lightening holes 46 for facilitating air circulation. As further indicated, the bottom edge of the clamping structure 44 is notched or serrated to provide a series of clamping feet 47. The front clamping structure 43 (not seen in FIG. 2) is of a similar construction.

Considering now the lower clamping assembly 27 and referring first to FIG. 2, such lower clamping assembly 27 includes an elongated support frame 50 supported above the flooring 42 by a synchronized system of screwjacks 51. As indicated in FIG. 3, these screwjacks 51 are coupled to the support frame 50 by way of bearing plate members 52 which are secured to and extend outwardly from the front and backsides of the support frame 50. The drive shafts of the screwjacks 51 are coupled to a motor (not shown) which, when activated, causes the screw jacks 51 to raise or lower the support frame 50, depending on the direction of rotation of the motor. Thus, screwjacks 51 constitute an elevator mechanism for the lower clamping assembly 27.

As best seen in FIG. 3, the lower clamping assembly 27 further includes a pair of spaced-apart clamping structures 53 and 54 which are mounted on top of the support frame 50. These clamping structures 53 and 54 are in the form of vertically extending plates which run almost the entire length of the support frame 50. These clamping structures 53 and 54 are joined by means of a crossmember or web member 55. Both longitudinal edges of this web member 55 are notched or serrated as indicated at 56. As indicated in FIG. 3, the lower clamping structure 53 is in line with the upper clamping structure 43 and is adapted to engage the underside of the plate 12 near the edge thereof to be welded. Similarly, the lower clamping structure 54 is in line with the upper clamping structure 44 and is adapted to engage the underside of the other plate 11 near the edge thereof to be welded.

The welding machine 10 further includes welding flux means for urging a body of welding flux 57 against the underside of the plates to be welded along and to either side of the edges thereof which are to be welded. The details of this welding flux means are best seen in the enlarged view of FIG. 4 which is an enlarged view of the region intermediate the lower clamping structures 53 and 54 of FIG. 3. With reference to FIG. 4, the welding flux means includes an elongated flux trough 58 which extends (at right angles to the plane of FIG. 4) the length of the clamping structures 53 and 54. This flux trough 58 includes the upper portions of the clamping structures 53 and 54 and an elongated movable member 59 which is located above the web member 55 and which extends the length of the clamping structures 53 and 54. This movable member 59 supports the upper half of a continuous conveyor belt 60 which is of a cleated type. A typical upwardly extending cleat on the upper half of the belt 60 is indicated at 61, while a typical downwardly extending cleat on the lower half of the belt 60 is indicated at 62. As indicated in FIG. 2, the conveyor belt 60 is spooled over pulley wheels 63 and 64 located adjacent the two longitudinal ends of the clamping structures 53 and 54.

As indicated in FIG. 4, there is located intermediate the movable member 59 and the web member 55 an inflatable conduit 65 which runs the length of the flux trough 58. This inflatable conduit 65 rests on a support block 66 and is sealed or closed at its two longitudinal ends. At an appropriate point intermediate the two ends of the conduit 65, there is located a hollow stem member 67 which communicates with the interior of the conduit 65 and which is adapted to have coupled thereto a fluid supply line 68 which runs to a source (not shown) of fluid under pressure. Such source is provided with suitable control valves for controlling the supplying of and releasing of the pressurized fluid to and from the inflatable conduit 65.

When the pressurized fluid is supplied to the interior of the inflatable conduit 65, such conduit expands and moves the movable member 59 and the conveyor belt 60 in an upwardly direction. This, in turn, urges the welding flux 57 in an upwardly direction and against the underside of the plates 11 and 12. Since the inflatable conduit 65 extends the length of the flux trough 58, the welding flux is urged against the underside of the plates 11 and 12 with a pressure which is uniform throughout the length of the flux trough 58. Adjustable closure members (not shown) are provided at the two ends of the flux trough 58 for preventing the welding flux from spilling out of or overflowing from the flux trough 58 at the two ends thereof.

The welding machine 10 further includes welding means 70 movable along the upper side of the plates adjacent the edges to be welded for welding such edges to one another. This welding means 70 includes carriage means movably supported on the upper clamping assembly 26 and adapted for longitudinal movement along such upper clamping assembly 26. Referring to FIG. 1, this carriage means includes a support carriage 71 which rides on longitudinally extending carriage tracks 73 and 74. These carriage tracks 73 and 74 extend almost the entire length of the support frames 29 and 30. As seen in FIG. 3, the carriage tracks 73 and 74 are in the form of channels which are secured to the support frames 29 and 30, respectively. The support carriage 71 is provided with wheels 75 which ride in these carriage track channels 73 and 74. As indicated in FIGS. 1 and 2, the support carriage 71 is caused to move by means of a drive chain 76 which is attached to the left-hand end of the support carriage 71, passes over a sprocket 77 mounted at the left-hand end of the upper clamping assembly 26, returns to and passes over a sprocket 78 located at the right-hand end of the support carriage 71, to which end it is also attached. The left-hand sprocket 77 is coupled by way of a belt 79 to a motor 80. Thus, actuation of the motor 80 causes movement of the support carriage 71. Motor 80 is a reversible motor so that the support carriage 71 can be caused to move in either direction along the carriage tracks 73 and 74.

With reference to FIG. 2, the welding means 70 further includes a pair of welding head units 81 and 82 mounted on the support carriage 71. These welding units 81 and 82 are of the arc welding type and are mounted for movement one behind the other along the line of the plate edges to be welded. The details of the welding head unit 81 are shown in FIG. 3. As there seen, the welding head unit 81 includes a head portion 83 and a downwardly extending barrel portion 84 which extends downwardly intermediate the vertical portions of the clamping structures 43 and 44. A lower end 85 of the barrel portion 84 constitutes the operating tip of the welding unit 81. As is seen, such tip 85 is spaced a short distance above the joint between the plates 11 and 12 which are being welded.

The head portion 83 is bolted to a bracket member 86 which in turn is bolted to the support carriage 71. Bracket member 86 is constructed to permit both vertical and horizontal adjustment of the position of the welding head unit 81. Mounted on top of the support carriage 71 is a supply reel 87 containing a supply of welding electrode wire 88. Welding electrode wire 88 is of the type having a flux core. This welding electrode wire 88 is fed downwardly through the welding unit barrel 84 by means of a pair of feed rollers 89 and 90 which are mounted on the head portion 83 and which are driven by a motor located inside of the main body of the head portion 83. As the electrode wire 88 emerges from the tip 85 and approaches the plates 11 and 12, it is melted by the electric arc to provide the filler metal for the welding bead, the flux core providing the gaseous shield which protects the molten metal from contamination.

The other welding head unit 82 is of a similar form of construction and is mounted on the support carriage 71 in the same manner as the first unit 81. As indicated in FIG. 2, the second welding head unit 82 includes a head portion 91, a downwardly extending barrel portion 92 and an electrode wire supply reel 93.

The welding machine 10 additionally includes a system for periodically replacing the welding flux in the flux trough 58 with clean welding flux. Referring to FIGS. 1 and 2, this system includes a cleaning tank 94 located near the right-hand end of the main body of the welding machine 10. Such cleaning tank 94 includes therein suitable straining filters for removing impurities from the welding flux. The flux cleaning system also includes flux circulating means for removing the welding flux 57 from the flux trough 58, passing it through the cleaning tank 94 and returning it to the flux trough 58. This flux circulating means includes the cleated conveyor belt 60 which runs along the bottom of the flux trough 58. It also includes a flux catching bin 95 located at the left-hand end of the flux trough 58 and having an enlarged open top for catching the flux as it is conveyed out of the flux trough by the cleated belt 60. This flux catching bin 95 communicates with a first flux transfer means, represented by an enclosed screw conveyor 96, which conveys the welding flux from the bin 95 back to the cleaning tank 94. The cleaned flux from the cleaning tank 94 is returned to the right-hand end of the flux trough 58 by means of a second flux transfer means represented by a conduit 97 and a funnel member 98. The cleaning tank 94 includes an appropriate motor driven pump for pumping the cleaned welding flux to the conduit 97. As will be seen, the flux cleaning system is not operated at the time the plates are being welded. It is instead operated during the intermediate intervals when further plates are being moved into the welding position.

OPERATION OF THE PREFERRED EMBODIMENT

Considering now the operation of the welding machine 10 described in connection with FIGS. 1—4, the upstream conveyor mechanism 14 (FIG. 1) initially receives the plates or panels to be welded. These plates or panels may be obtained from a supply station or from an earlier stage in overall manufacturing operation. The plates or panels are supplied one at a time to the upstream conveyor mechanism 14. For purposes of explanation, it will be assumed that the items to be welded are reinforced structural panels each of which is comprised of a structural steel plate having a series of structural steel shapes welded to the top side thereof.

Initially, the upper and lower clamping assemblies 26 and 27 (FIG. 2) are in their open positions, that is, the upper clamping assembly 26 is at a raised position well above the top line of the conveyor mechanisms 14 and 15 and the lower clamping assembly 27 is at a lowered position below the top line of the conveyor mechanisms 14 and 15. A first of the panels, for example, the plate 11 panel is transferred by the upstream conveyor mechanism 14 to the downstream conveyor mechanism 15 and the downstream conveyor mechanism 15 is brought to a halt when the trailing edge of the plate 11 panel reaches approximately the center line of the upper and lower clamping assemblies 26 and 27. The next panel, for example, the plate 12 panel, is then moved into position by the upstream conveyor mechanism 14. The upstream conveyor mechanism 14 is brought to a halt such that the leading edge of this plate 12 panel ends up in contact with or very close to the trailing edge of the plate 11 panel. The two conveyor mechanisms 14 and 15 are then operated in opposite directions, the mechanism 14 being operated to urge the plate 12 panel in the downstream direction, while the mechanism 15 is operated to urge the plate 11 panel in an upstream direction. This serves to butt the two plates 11 and 12 against one another. In addition, the operating power applied to the conveyor mechanism 14 is adjusted relative to the operating power applied to the mechanism 15 so as to bring the abutting edges of the two plates into alignment with the centerline of the clamping assemblies 26 and 27. The operation of the conveyor mechanisms 14 and 15 is then discontinued.

At this point, the elevator mechanism (screwjacks 51 of FIGS. 2 and 3) associated with the lower clamping assembly 27 is operated to raise the lower clamping assembly 27 until the upper edges of the clamping structures 53 and 54 (FIG. 3) contact the lower surfaces of the two plates 11 and 12. Then the elevator mechanism (screwjacks 40 of FIG. 1) associated with the upper clamping assembly 26 is operated to lower the upper clamping assembly 26 until the bottom edges of the clamping structures 43 and 44 (FIG. 3) rest on the top surfaces of the plates 11 and 12. This clamps the ends of the plates 11 and 12 near the edges to be welded between the upper clamping structures 43 and 44 and the lower clamping structures 53 and 54. This is the condition shown in FIG. 3.

After the plates are properly clamped, the pressurized fluid is admitted to the inflatable conduit 65 (FIG. 4) located in the flux trough 58 and is allowed to inflate such conduit 65. This urges the movable member 59, the conveyor belt 60 and, hence, the body of welding flux 57 in an upwardly direction against the underside of the plates being welded. Sufficient pressure is supplied to the inflatable conduit 65 to insure that the welding flux 57 is urged against the underside of the plates 11 and 12 with a pressure which is uniform throughout the length of the edges to be welded. This provides a uniform resistance for the welding arc and results in the production of a highly uniform welding bead along the length of the seam.

Initially, the support carriage 71 carrying the welding head units 81 and 82 is positioned at one end of the upper clamping assembly support frame structures 29 and 30 such that the welding head units 81 and 82 are located beyond the end of the upper clamping assembly clamping structures 43 and 44 (see structure 44 in FIG. 2). The welding voltage is then applied to the electrode wires in the welding head units 81 and 82. At the same time, the support carriage drive motor 80 is actuated to cause the support carriage 71 to move along the carriage tracks 73 and 74 to the opposite side of the upper clamping assembly 26. At this time, the electrode wire feed motors in the head portions 83 and 91 of the welding units 81 and 82 are operated to continuously feed the electrode wires through the welding unit barrels 84 and 92. This produces a welding bead 99 (FIG. 4) which joins together the ends of the plates 11 and 12.

The use of a pair of welding head units is particularly important for the case of relative thick plates. The respective functions of the two welding head units 81 and 82 are indicated in FIGS. 5 and 6. The leading head unit (e.g., unit 82 if the carriage 71 is moving to the right in FIG. 2) is operative to burn through the plates 11 and 12 and to form the bottom portion of the welding bead as indicated at 101 in FIG. 5. The trailing welding head unit (e.g., unit 81 if carriage 71 is moving to the right in FIG. 2) is operative to form the remainder of the welding bead as indicated at 102 in FIG. 6. In other words, the trailing unit adds filler metal to complete the welding seam, the completed seam being as shown in FIG. 6. For relatively thin plates (e.g., plates having a thickness of less than one-quarter of an inch), only one of the welding head units need be used. In such case, the second welding head unit can be disabled by not supplying any welding voltage thereto.

After the welding head units 81 and 82 have traversed the plates to be welded, such units are brought to rest at the other side of the machine and the pressurized fluid is released from the inflatable conduit 65 to allow same to deflate. Then the upper and lower clamping assemblies 26 and 27 are opened by raising the upper assembly 26 and lowering the lower assembly 27 by means of their respective elevator mechanisms. If the plates are to be welded together in sets of two, then the conveyor mechanisms 14 and 15 are operated so as to move the two welded together plates onward in the downstream direction to the next stage in the manufacturing operation or, alternatively, to a storage area. The conveyor mechanisms 14 and 15 are then operated to move the next pair of plates into welding position, following which the foregoing welding cycle is again repeated for this second pair of plates.

If, on the other hand, a third plate is to be welded to the second plate of the first pair, then the conveyor mechanisms 14 and 15 are operated to move the trailing edge of the second plate into the welding position and to bring the leading edge of the third plate into contact with the trailing edge of the second plate. When the positioning is completed, the foregoing welding cycle is repeated to butt weld the third plate to the second plate.

During the time intervals when the conveyor mechanisms 14 and 15 are being operated to bring the plates into welding position, the flux cleaning system is operated to remove the dirty welding flux from the flux trough 58 and to fill such flux trough 58 with a supply of fresh welding flux. This is accomplished by actuating the motors for the cleated conveyor belt 60, the screw in the screw conveyor 96 and the pump in the flux cleaning tank 94.

As indicated in FIG. 3, the structural shapes (e.g., 11a and 12a) are welded to the top sides of the plates (e.g., 11 and 12) which are to be butt welded. It should be noted, however, that the welding machine 10 also accommodates the case where the structural shapes are instead welded to the bottom sides of the plates. In terms of FIG. 3, this inverted situation would be represented by turning the structural panels upside down so that the structural shapes 11a and 12a rest directly on the conveyor chains 16 and 18 with the plates 11 and 12 being on top of the shapes.

The operation of the welding machine 10 involves the turning on and off of various motors, the turning on and off of the welding electrode voltages and the opening and closing of the control valves for the inflatable conduit in the proper sequences and at the proper times. These switching and timing functions may be readily performed by a human operator who is present and who is observing the performance of the various steps in the process. In such case, the operator would be provided with a master control panel upon which are mounted the various switches for controlling the motors and valves and so forth.

Even though this would provide quite satisfactory operation, a major advantage of the present welding machine is that it may be readily adapted for operation in a completely automatic manner. In particular, the various switching and timing functions just described may be readily performed by means of appropriate automatic control circuits and timing circuits, together with the use of appropriate position sensing devices for signalling when the plates to be welded and the movable elements of the welding machine are at their various positions during the various phases of the welding cycle. In this manner, when a plate or machine element reaches a particular position, a control signal would be generated which would cause the initiation of a particular step in the process. When the step is completed, a second control signal would be generated to activate the appropriate mechanism for performing the next step in the process.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

I claim:

1. A welding machine for butt welding one plate to another comprising:
    conveyor means for feeding the plates to be welded into a welding position with the edges to be welded abutting one another;
    clamping means for clamping both plates near the edges to be welded;
    welding flux means for urging a body of welding flux against one side of the plates along and to either side of the edges to be welded;
    and welding means movable along the other side of the plates adjacent the edges to be welded for welding such edges to one another.

2. A welding machine in accordance with claim 1 wherein the clamping means are retractable and wherein the conveyor means comprises first and second conveyor mechanisms located on opposite sides of the clamping means for moving plates through the clamping zone when the clamping means are retracted.

3. A welding machine in accordance with claim 1 wherein the clamping means includes:
    a first retractable clamping assembly located on one side of the plates and having a pair of spaced-apart clamping structures, one being adapted to engage one plate near the edge to be welded and the other being adapted to engage the other plate near the edge to be welded;
    and a second retractable clamping assembly located on the other side of the plates and having a pair of spaced apart clamping structures, one being adapted to engage one plate near the edge to be welded and the other being adapted to engage the other plate near the edge to be welded;

and wherein the welding flux means is located intermediate the clamping structures of the first clamping assembly and the welding means is located intermediate the clamping structures of the second clamping assembly.

4. A welding machine in accordance with claim 1 wherein the conveyor means are horizontal conveyor means and wherein the clamping means clamp the plates to be welded in horizontal positions and wherein the welding flux means includes:
flux trough means for containing the body of welding flux, such flux trough means being adapted to contact the underside of the plates so as to bridge across end portions of the plates adjacent the edges to be welded;
and means associated with the flux trough means for urging the welding flux in an upwardly direction with a pressure which is uniform throughout the length of the flux trough means.

5. A welding machine in accordance with claim 4 wherein the means for urging the welding flux in an upwardly direction includes inflatable conduit means running the length of the flux trough means and means for supplying a fluid under pressure to the interior of the conduit means.

6. A welding machine in accordance with claim 4 wherein the means for urging the welding flux in an upwardly direction includes means providing a movable bottom portion for the flux trough means and means for urging the movable bottom portion in an upwardly direction.

7. A welding machine in accordance with claim 6 wherein the means for urging the movable bottom portion in an upwardly direction includes inflatable conduit means located below the movable bottom portion and running the length of the flux trough means and means for supplying a fluid under pressure to the interior of the conduit means.

8. A welding machine in accordance with claim 1 wherein the welding means includes at least one welding head unit and a support carriage for moving the operating tip of such unit along the line of the edges to be welded.

9. A welding machine in accordance with claim 1 wherein the welding means includes a pair of welding head units mounted for movement one behind the other along the line of the edges to be welded, the leading head unit being operative to burn through and form a bottom portion of the welding bead and the trailing head unit being operative to form the remainder of the welding bead.

10. A welding machine in accordance with claim 1 wherein:
the conveyor means includes first and second horizontal conveyor mechanisms located on opposite sides of the clamping means for supporting the plates in horizontal positions;
the clamping means includes retractable upper and lower clamping assemblies having cooperating clamping structures for engaging the plates near the edges to be welded;
the welding flux means includes flux trough means supported on the lower clamping assembly and adapted to contact the underside of the plates so as to bridge across end portions of the plates adjacent the edges to be welded, means providing a movable bottom portion for such flux trough means, inflatable conduit means located below the movable bottom portion means and running the length of the flux trough means and means for supplying a fluid under pressure to the interior of the conduit means;
and the welding means includes at least one welding head unit and a support carriage movably supported on the upper clamping assembly for moving the operating tip of the welding head unit along the line of the edges to be welded.

11. A welding machine for butt welding one plate to another comprising:
an elongated lower clamping assembly;
an elongated upper clamping assembly located above and aligned with the lower clamping assembly;
first and second elevator means for individually raising and lowering the upper and lower clamping assemblies for enabling such assemblies to clamp therebetween the two adjacent ends of the plates to be welded;
first and second conveyor mechanisms located on opposite sides of the lower clamping assembly for moving plates through the clamping zone when the upper and lower clamping assemblies are separated, these conveyor mechanisms enabling the plates to be positioned so that the edges to be welded are in the proper alignment with respect to one another and with respect to the upper and lower clamping assemblies;
carriage means movably supported on the upper clamping assembly and adapted for longitudinal movement along such upper clamping assembly;
welding head means supported on the carriage means with the operating tip thereof adjacent the bottom line of the upper clamping assembly when in clamping position with the plates to be welded;
elongated flux trough means supported on the lower clamping assembly adjacent the top thereof and aligned with the line of travel of the operating tip of the welding head means, such flux trough means being adapted to hold a welding flux;
and means associated with the flux trough means and adapted to urge welding flux therein in an upwardly direction.

12. A welding machine in accordance with claim 11 wherein the upper clamping assembly includes a pair of elongated spaced-apart downwardly extending clamping structures, one being adapted to engage one plate near the edge to be welded and the other being adapted to engage the other plate near the edge to be welded, the carriage means being constructed to move the welding head means along the space between these upper clamping structures, and wherein the lower clamping assembly includes a pair of elongated spaced apart upwardly extending clamping structures, one being adapted to engage one plate near the edge to be welded and the other being adapted to engage the other plate near the edge to be welded, the flux trough means being formed intermediate these lower clamping structures.

13. A welding machine in accordance with claim 11 wherein the welding head means includes a pair of welding head units mounted for movement one behind the other along the line of the edges to be welded, the leading head unit being operative to burn through and form a bottom portion of the welding bead and the trailing head unit being operative to form the remainder of the welding bead.

14. A welding machine in accordance with claim 11 wherein the means associated with the flux trough means includes inflatable conduit means running the length of the flux trough means and means for supplying a fluid under pressure to the interior of the conduit means.

15. A welding machine in accordance with claim 11 wherein the means associated with the flux trough means includes means forming a movable bottom portion for such flux trough means, inflatable conduit means located below the movable bottom portion means and running the length of the flux trough means and means for supplying a fluid under pressure to the interior of the conduit means.

16. A welding machine in accordance with claim 11 which further includes:
flux cleaning means for removing welding impurities from welding flux;
and flux circulating means for removing welding flux from the flux trough means, passing it through the flux cleaning means and returning it to the flux trough means.

17. A welding machine in accordance with claim 16 wherein the flux circulating means includes:
cleated belt means running along the bottom of the flux trough means for conveying welding flux out of one end of the flux trough means;
flux catching means located at this one end of the flux trough means for catching the flux conveyed out by the cleated belt means;

first flux transfer means for conveying the welding flux from the flux catching means to the flux cleaning means; and second flux transfer means for conveying the cleaned welding flux from the flux cleaning means back to the other end of the flux trough means.

PO-1050
(5/69)

UNITED STATES PATENT OFFICE
CERTIFICATE OF CORRECTION

Patent No. 3,576,421              Dated April 27, 1971

Inventor() HARRY J. FIEGEL, JR.

It is certified that error appears in the above-identified patent and that said Letters Patent are hereby corrected as shown below:

Column 5, line 17, before "support" insert --upper clamping assembly 26 and returns to the right-hand end of the--.

Signed and sealed this 3rd day of August 1971.

(SEAL)
Attest:

EDWARD M. FLETCHER, JR.          WILLIAM E. SCHUYLER, JR.
Attesting Officer                Commissioner of Patents